Patented Jan. 1, 1924.

1,479,394

UNITED STATES PATENT OFFICE.

JAMES MEADE, OF STOUGHTON, MASSACHUSETTS.

MANUFACTURE OF RUBBERIZED FABRIC.

No Drawing.   Application filed January 30, 1923.  Serial No. 615,968.

*To all whom it may concern:*

Be it known that I, JAMES MEADE, a citizen of the United States, and a resident of Stoughton, Norfolk County, Massachusetts, have invented certain new and useful Improvements in the Manufacture of Rubberized Fabric, of which the following is a specification.

This invention relates to a method of producing rubberized fabric having a surface with a glossy finish and I aim particularly to produce such a finish on this material which will not turn chalky when rubbed.

According to standard practice it has been customary to produce a glossy finish on rubberized fabric by dusting the surface of the material with potato starch after the rubber has been applied and then curing the rubber in a sulphur chloride vapor. Attempts have been made to cure such articles in a solution of sulphur chloride but this has not been found successful as it causes the starch to smudge, and gives a product with a surface of very uneven qualities. By my invention I am able to produce a cloth which has the glossy finish having the initial appearance of the standard article, but in which the finish is much more permanent and will not become chalky when rubbed. I accomplish this by giving the material a double curing, partially curing it in the vapor to the point where the starch is substantially attached to the rubber and then finishing the cure in the liquid solution. By combining the two cures I am able to overcome the defect in the material which has been recognized as a serious problem for a great many years. The manner of carrying out my invention can be easily understood from the following illustrative example:

Rubberized fabric dusted with potato starch was prepared in the usual manner. A curing chamber was then prepared by introducing into the room a saucer full of a 50% solution of sulphur chloride dissolved in equal quantities of carbon tetrachloride and naphtha. The room was heated to a temperature of about 125° F. and after the atmosphere was thoroughly impregnated with the sulphur chloride, the rubberized fabric was taken into the room and allowed to remain there for ten minutes. The fabric was then submitted to a cure with a liquid solution of sulphur chloride. This was prepared by dissolving 2% of sulphur chloride in a solvent comprising equal quantities of carbon tetrachloride and naphtha. The solution was applied to the rubber by passing the fabric, face down, over a wooden roller, which roller dipped into the solution in question, so that the roller was kept saturated with the solution. This completed the cure of the surface and produced a fabric having a fine glossy finish and one which would not become chalky when rubbed. A further advantage of my process was that the time of treatment is materially reduced.

It is to be noted that the foregoing example is given by way of illustration only and that the same may be modified in many particulars without departing from the spirit of my invention.

What I claim is:

1. The method of producing a fixed glossy finish on rubberized fabric which comprises the steps of preparing the rubberized fabric with a dusting of starch, partially curing the fabric in a sulphur chloride vapor, and completing the cure with a solution of sulphur chloride in the liquid phase.

2. In the process of producing rubberized fabric with a glossy finish, the steps of curing the material in a vaporous vulcanizing agent for about ten minutes and then completing the cure with a liquid vulcanizing agent.

3. The method of producing rubberized fabric with a glossy finish, which comprises the steps of preparing the rubberized fabric with a dusting of starch, subjecting the material to the action of a vaporous vulcanizing agent until a partial cure is obtained, and then finishing the cure with a liquid vulcanizing agent.

4. The method of producing rubberized fabric with a glossy finish, which comprises the steps of preparing the rubberized fabric with a dusting of starch, and curing the rubber in part by the action of a vaporous vulcanizing agent and in part by the action of a liquid vulcanizing agent.

5. As a new product of manufacture rubberized fabric having a substantially uniform glossy finish which does not readily become chalky when rubbed.

JAMES MEADE.